United States Patent
Bathon

[19]

[11] Patent Number: 5,954,447
[45] Date of Patent: Sep. 21, 1999

[54] HIGH STRENGTH COUPLING FOR WOOD STRUCTURAL MEMBERS

[76] Inventor: Leander Bathon, Talstrasse 6, 65719 Hofheim, Germany

[21] Appl. No.: 08/915,010

[22] Filed: Aug. 20, 1997

Related U.S. Application Data

[62] Division of application No. 08/357,997, Dec. 16, 1994, Pat. No. 5,660,492.

[30] Foreign Application Priority Data

Dec. 18, 1993 [DE] Germany ............................ 9319497 U
Feb. 28, 1994 [DE] Germany ............................... 4406433

[51] Int. Cl.$^6$ ...................................................... F16B 12/04
[52] U.S. Cl. ........................... 403/267; 403/268; 403/265
[58] Field of Search ..................... 403/267, 268, 403/269, 265, 266, 405.1, 406.1, 407.1, 273, 206

[56] References Cited

U.S. PATENT DOCUMENTS

| | | | |
|---|---|---|---|
| 419,763 | 1/1890 | Fletcher | 403/267 |
| 1,516,975 | 11/1924 | McArthur | 403/268 |
| 2,053,382 | 9/1936 | Stickley | 403/268 |
| 3,405,592 | 10/1968 | Blodee | 403/267 X |
| 3,502,359 | 3/1970 | Lucci | 403/267 |
| 3,802,206 | 4/1974 | Moore et al. | 403/267 X |
| 4,390,578 | 6/1983 | Brooks | 403/267 X |
| 4,474,493 | 10/1984 | Welch | 403/405.1 X |
| 4,493,582 | 1/1985 | Drabsch | 403/267 X |
| 4,681,477 | 7/1987 | Fischer | 403/268 X |
| 4,925,331 | 5/1990 | Bertsche | 403/266 X |
| 5,037,234 | 8/1991 | De Jong | 403/268 |
| 5,466,086 | 11/1995 | Goto | 403/268 |

FOREIGN PATENT DOCUMENTS

| | | | |
|---|---|---|---|
| 1485811 | 1/1970 | Germany | A43B 9/12 |
| 2533342 | 2/1976 | Germany | F16B 11/00 |
| 2823579 | 12/1978 | Germany | 403/269 |
| 3132828 | 3/1983 | Germany | F16B 7/00 |
| 1534224 | 1/1990 | U.S.S.R. | 403/265 |

*Primary Examiner*—Harry C. Kim
*Attorney, Agent, or Firm*—Stoel Rives LLP

[57] ABSTRACT

A wood structural member coupling of the present invention includes a pocket having slots formed within the wood structural member to receive tongue portions of a connector base, which is bonded by an adhesive within the pocket. A connector extension extends from the base and includes a coupling for connecting to another structural member.

13 Claims, 7 Drawing Sheets

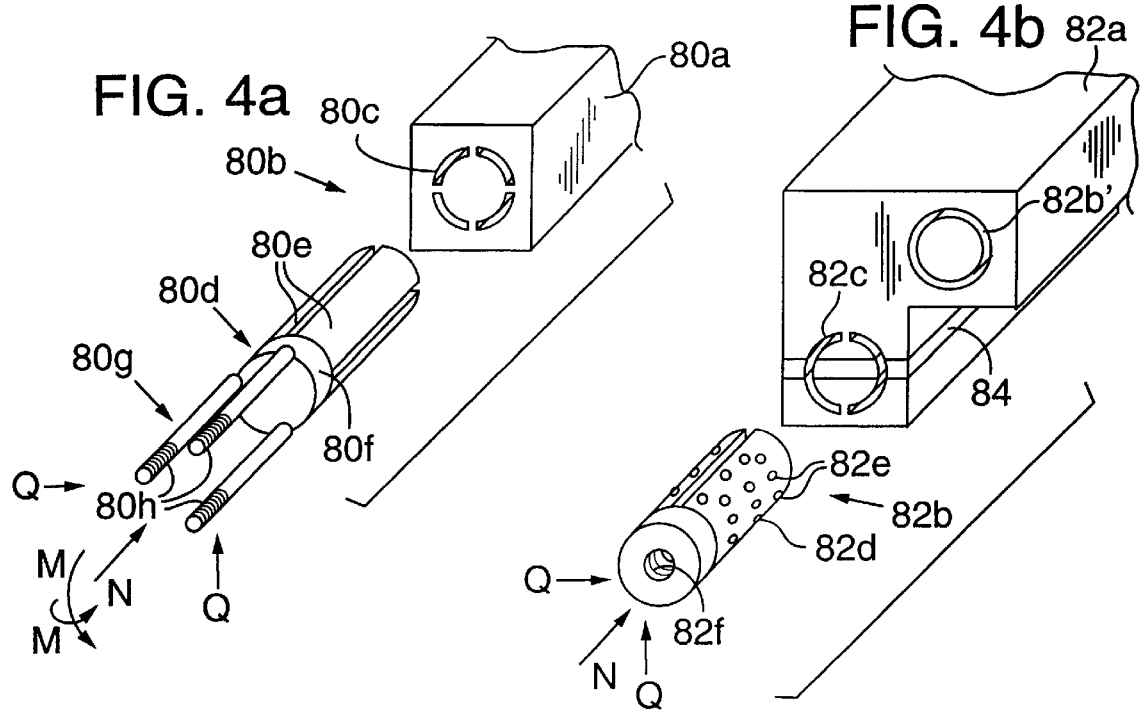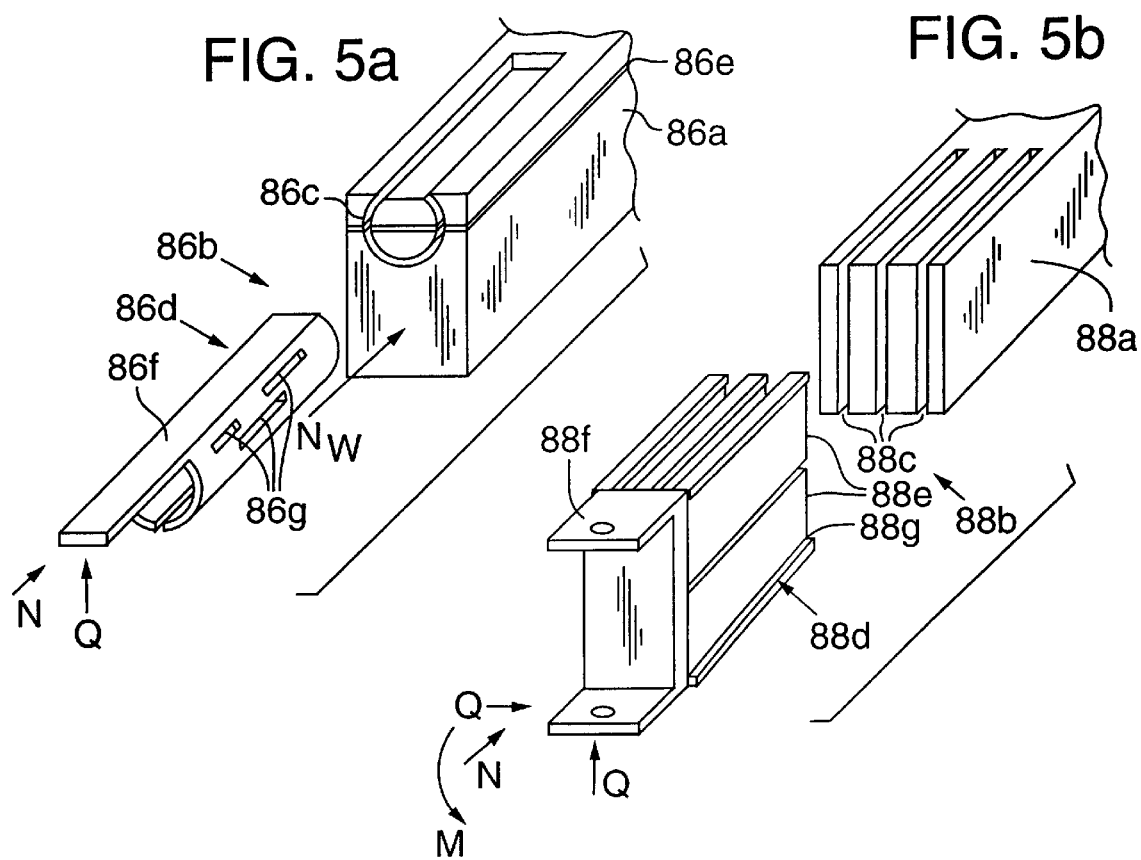

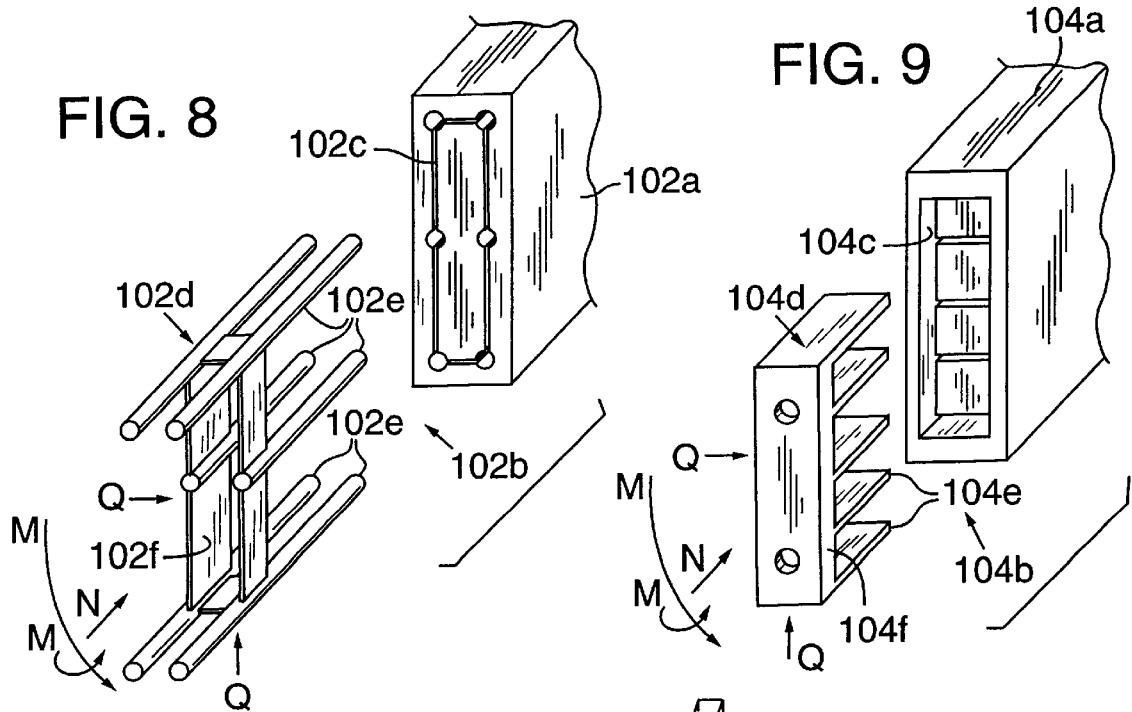
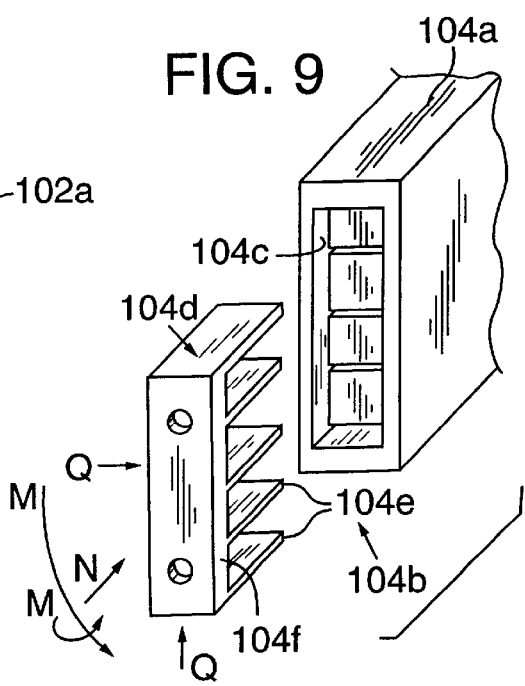
FIG. 8
FIG. 9
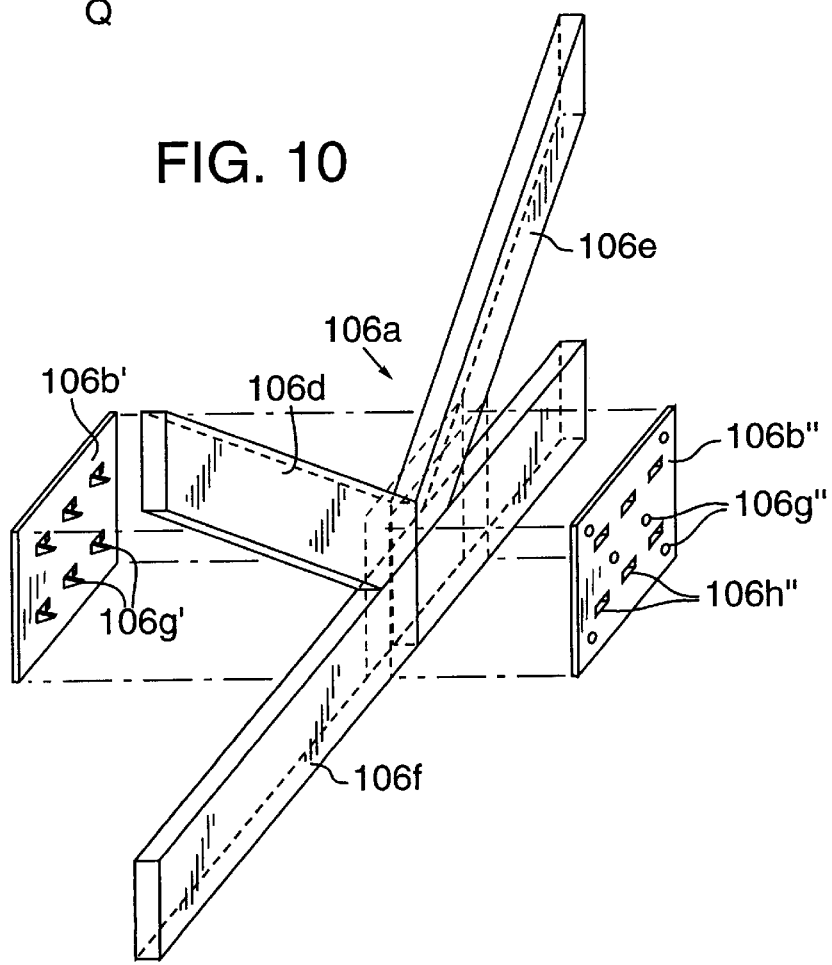
FIG. 10

HIGH STRENGTH COUPLING FOR WOOD STRUCTURAL MEMBERS

RELATED APPLICATION

This is a division of application Ser. No. 08/357,997, filed Dec. 16, 1994, now U.S. Pat. No. 5,660,492.

TECHNICAL FIELD

The present invention relates to connectors for wood structural members and, in particular, to a connection system for coupling wood structural members to other structural members with improved transmission of forces or moments.

BACKGROUND OF THE INVENTION

Wood structural members such as glue laminated wood beams, parallel strand lumber, laminated veneer lumber, laminated stranded lumber, or solid lumber are used in the construction of buildings and other structures, such as bridges. Wood structural members typically support significant loads in such structures, for example, as beams spanning open areas or as columns supporting other structural members.

The wood structural members in a structure are typically coupled together or to other structural materials by steel plates bolted to exposed faces of the wood structural members. To provide adequate transmission of loads or moments through such couplings, relatively large numbers of bolts (e.g., up to about 40 per member connection) are typically required. Assembling such couplings can be relatively time-consuming and expensive.

The bolt holes in the wood structural members and the steel coupling plates are drilled separately because wood and steel have different boring rates. Drilling them together would typically result in unacceptable damage to the wood structural members. In an attempt to simplify the assembly of wood structural members at the site of construction, bolt holes are typically formed in the steel coupling plates and the wood structural members before they are delivered to the site where the structure is being built. However, prefabricated bolt holes in wood structural members often do not precisely match the prefabricated bolt holes in the corresponding steel coupling plates.

The main reason is that wood structural members frequently undergo dimensional changes between the time they are manufactured and the time they are assembled in a structure. The dimensional changes occur in response to temperature and moisture variations that arise under different weather conditions when the wood structural members are manufactured, transported, and finally assembled. Such dimension changes are typically less than about 0.2 percent and 6 percent of the respective length and width of a wood structural member. However, even such small variations can introduce unacceptable misalignment between prefabricated holes in wood structural members and steel coupling plates.

Another disadvantage of conventional external plate and bolt couplings is that they are relatively inefficient at transmitting loads between structural members. One reason is that relatively large volumes of wood structural members typically must be removed in drilling all of the bolt holes required of a coupling. Another reason is that deformation occurs between the steel coupling plates and the wood structural members, even if large numbers of bolts are used. Slack forms where a coupling has been deformed and increases whenever the deformation is repeated. This can eventually lead to failure of the structural coupling, particularly under seismic or other dynamic load situations.

Another disadvantage of conventional external plate and bolt couplings is that they do not withstand the thermal loads in a fire as well as wood does and therefore lower the overall fire resistance of the structure. A further disadvantages of conventional external plate and bolt couplings are that they are aesthetically displeasing.

SUMMARY OF THE INVENTION

An object of the present invention is, therefore, to provide an improved coupling for wood structural members.

Another object of this invention is to provide such a wood structural coupling that may be prefabricated and assembled substantially without on-site modification of the wood structural member or the coupling.

A further object of this invention is to provide such a wood structural coupling that provides improved transmission of forces and moments between structural members.

Still another object of this invention is to provide such a wood structural coupling that substantially maintains the fire resistance characteristic of wood structural members.

Yet a further object of this invention is to provide such a wood structural coupling with improved load bearing characteristics under dynamic loads.

Still another object of this invention is to provide such a wood structural coupling that maintains the aesthetics of wood structural members.

A wood structural member coupling of the present invention includes a pocket formed within the wood structural member to receive a connector base, which is adhered within the pocket. A connector extension extends from the base and includes a coupling for connecting to another structural member. The connector extension may include a conventional structural coupling such as, for example, a bolt plate, or a second connector base according to the present invention.

The pocket or pockets formed in a wood structural member are slightly oversized relative to the size of the connector base or bases so that typical dimensional changes in the wood structural member do not cause misalignment of the pocket or pockets. The interstices between the oversized pocket or pockets and the connector base or bases are filled by the adhesive during assembly. As a result, the wood structural coupling of the present invention facilitates prefabrication of wood structural members and the couplings, thereby reducing manufacturing and assembly costs.

Preferably, the connector base is shaped according to the load to be applied to the wood structural coupling and to provide maximal connecting surface area between the connector base, the pocket in the wood structural member, and the bonding adhesive, but with minimal removal of wood material. Roughened, perforated, or segmented connector bases provide improved adhesion to some connector bases and distribution of adhesive over connector bases and the corresponding pockets. Moreover, segmentation and perforation of connector bases cooperates with the adhesive to maintain the load bearing capacity of the coupling even if the wood structural member undergoes dimensional changes after a connector base is adhered thereto. The segments and perforations allow the adhesive between the connector base and the pocket to deform without significant loss of load carrying capacity in the coupling.

Wood structural member couplings of the present invention may be formed of a variety of non-wood materials, including metals such as steel, bronze, copper, and aluminum, of which steel is preferred in part for its suitability in casting various shapes, as well as other materials such as plastics, ceramics or synthetic fiber composites. Suitable adhesives include elastic or plastic types such as, for example, phenol-formaldehyde, melamine-formaldehyde, polyesters, epoxies, or polyurethane. These couplings also allow wood structural members to be coupled together as well as to structural members of other materials, such as steel and concrete.

Wood structural couplings of the present invention provide improved transmission of loads and moments between structural members by coupling wood structural members to other structural members with minimal removal of wood material, thereby maintaining the load or moment capacity of wood structural members. The internal positioning of the wood structural coupling provides decreased susceptibility to deformation of the coupling under dynamic loads (e.g., seismic) and protects the coupling from thermal loads that can occur in a fire and would typically cause severe damage or failure of a conventional external plate and bolt coupling. Wood structural couplings of the present invention also provide improved aesthetics by positioning the couplings substantially inside wood structural members.

Additional objects and advantages of the present invention will be apparent from the following detailed description of a preferred embodiment thereof, which proceeds with reference to the accompanying drawings.

BRIEF DESCRIPTION OF THE DRAWINGS

FIGS. 4a and 4b are exploded isometric views of further preferred embodiments of the connection system.

FIGS. 5a and 5b are exploded isometric views of embodiments of the connection system with tubular connectors.

FIG. 8 is an exploded isometric view of the connection system with rod members.

FIG. 9 is an exploded isometric view with multiple flat plates.

FIG. 10 is an exploded isometric view of another preferred embodiment of the connection system.

DETAILED DESCRIPTION OF PREFERRED EMBODIMENTS

Figure 1:
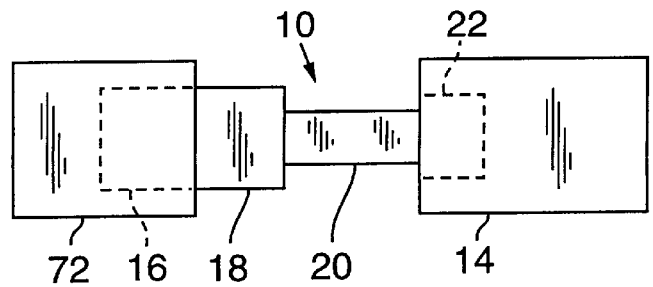
FIG. 1 is schematic side elevation view of a connection system of the present invention.
Figure 2A:
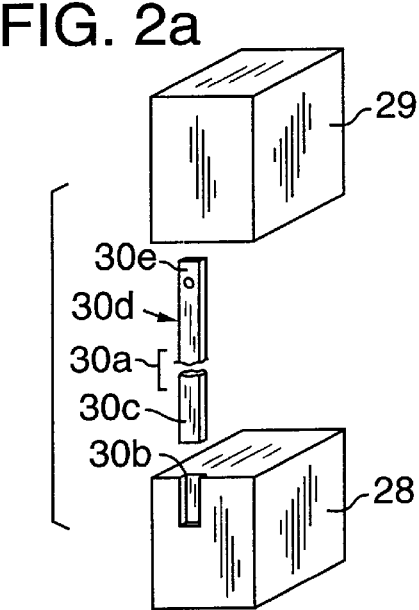
FIGS. 2a–2f are exploded isometric views of various preferred embodiments of the connection system.
Figure 2B:
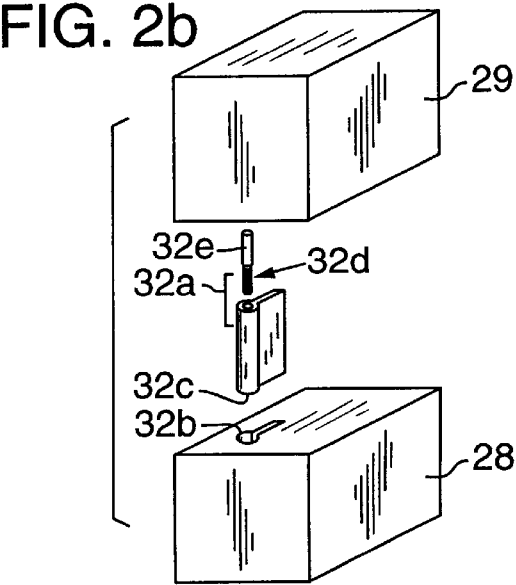
Figure 2C:
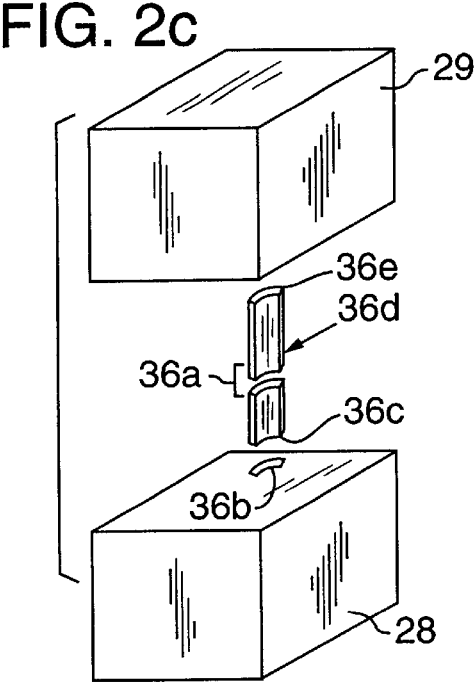
Figure 2D:
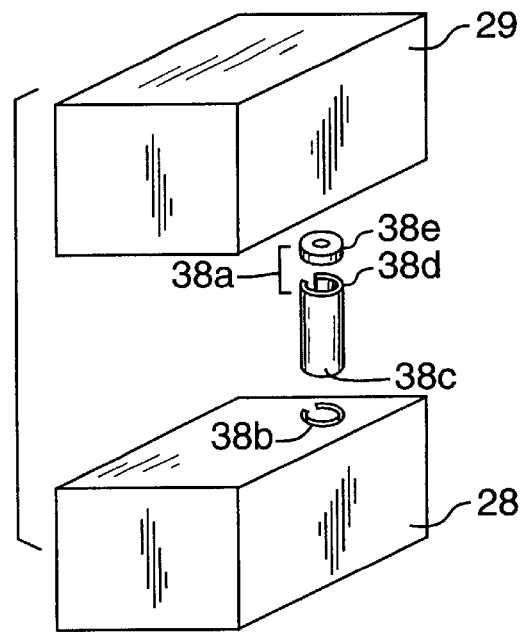
Figure 2E:
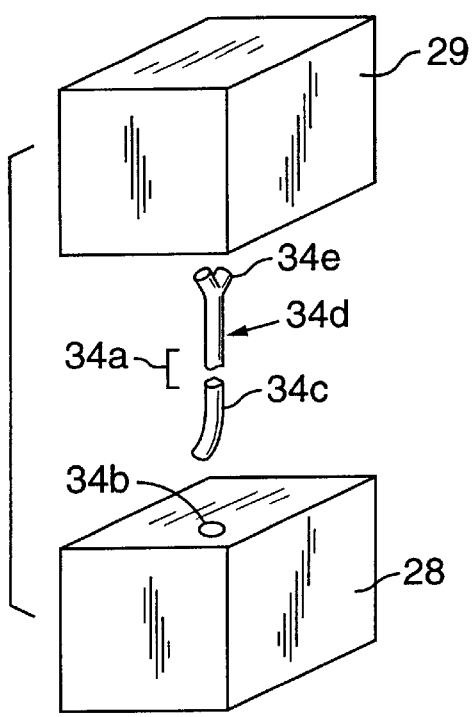
Figure 2F:
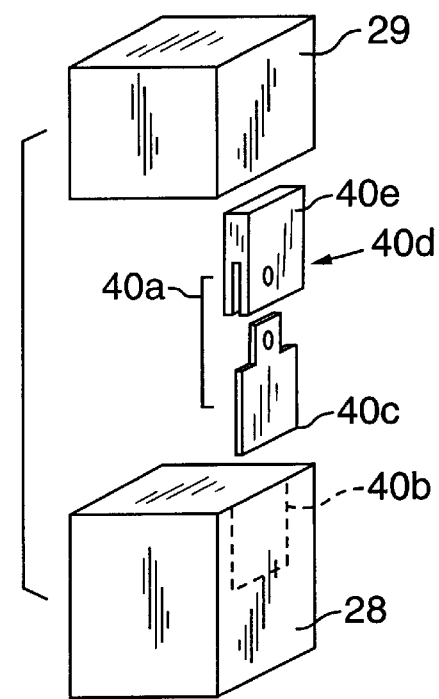
Figure 3A:
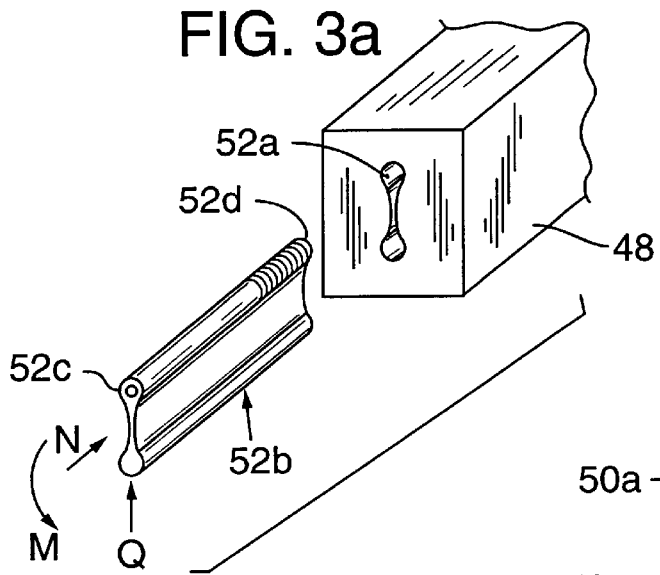
FIGS. 3a–3e are exploded isometric views of alternative preferred embodiments of the connection system.
Figure 3B:
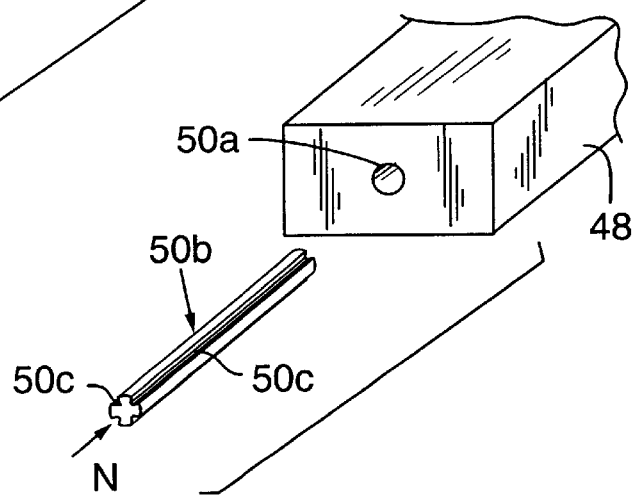
Figure 3C:
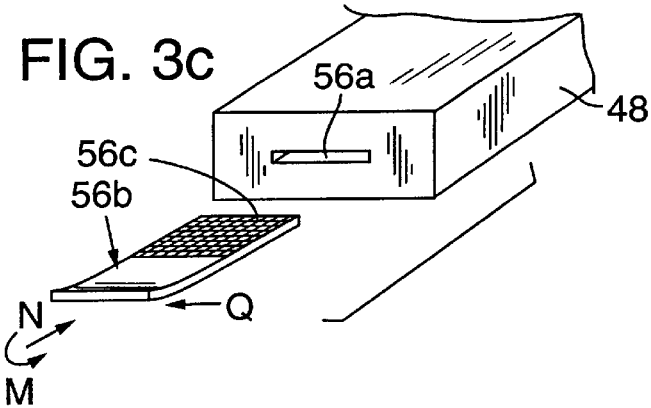
Figure 3D:
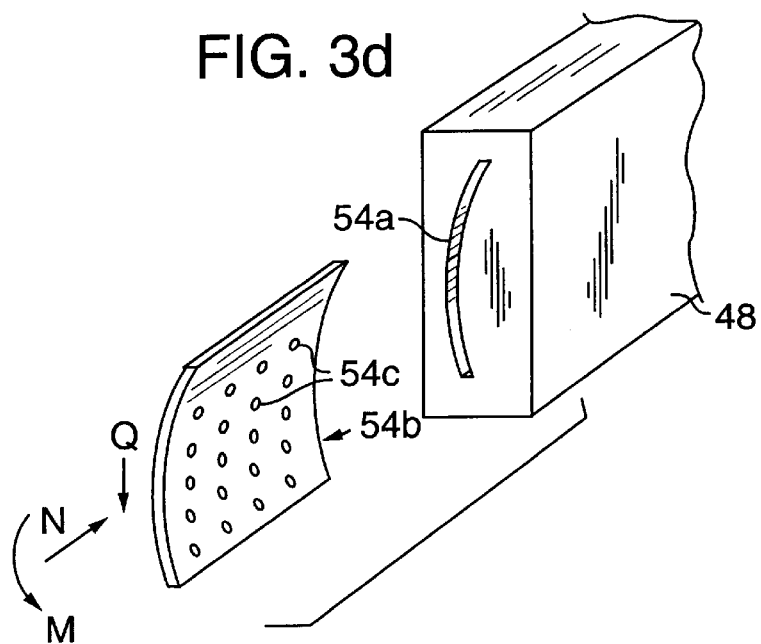
Figure 3E:
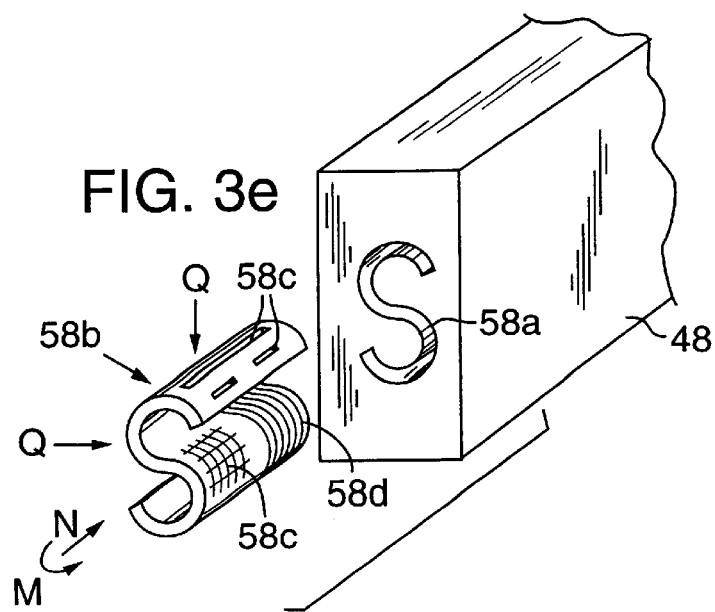

FIG. 1 is a schematic side elevation view of a wood structural member coupling 10 of the present invention for connecting a wood structural member 12 and another structural member 14, which may be of wood, concrete, steel, or any other structural used in the construction of buildings and other structures, such as bridges. Coupling 10 includes a connector pocket 16 formed within wood structural member 12 to receive a connector base 18, which is adhered connector pocket 16. A connector extension 20 extends from connector base 18 and includes a coupling 22 for connecting to other structural member 14. Connector extension 20 may include a conventional structural coupling such as, for example, a bolt or connector plate, or any other structural coupling.

Wood structural member 12 may be, for example, a glue laminated wood member, parallel strand lumber, laminated veneer lumber or solid lumber, as used in the construction of buildings and other structures, such as bridges. Wood structural members typically support significant loads in such structures, for example, as beams spanning open areas or as columns supporting other structural members.

FIGS. 2a–2f are exploded isometric views of various preferred embodiments of structural wood coupling of the present invention shown in relation to a structural wood member 28 and another structural member 29. It will be appreciated that the embodiments shown in FIGS. 2a–2f are shown together for purposes of brevity and would typically not all be used together as shown. The embodiments of FIGS. 2a–2f are intended to show in part the variety of structural couplings that can be formed in accordance with the present invention.

Structural wood couplings 30a–40a are shown in relation to a wood structural member 28 in which connector pockets 30b–38b are formed and an external location 40b designated to receive connector bases 30c–40c, respectively. Connector pockets 30b–38b are preferably formed so as to provide initial separations of 0 mm–4 mm from the complementary surfaces of respective connector bases 30c–38c. Alternatively, connector pockets 30b–38b are formed with dimensions that are up to about 30 percent greater than the complementary dimensions of respective connector bases 30c–38c. As another alternative, connector bases 30c–38c can include protrusions (not shown) that extend into the surfaces of respective connector pockets 30b–38b.

In accordance with the present invention, connector bases 30c–40c are adhered within or against pockets 30b–38b and location 40b, respectively, with glues or adhesives that fill the separations and form bonds characterized as elastic, plastic, or rigid, according to the structural application. Elastic adhesives are used for "softer," more flexible couplings. Plastic adhesives are used for "stiffer," more rigid couplings. Suitable adhesives include duroplastes and thermoplastes such as, for example, phenol-formaldehyde, melamine-formaldehyde, polyesters, epoxies, or polyurethane. Polyester, epoxy, and polyurethane adhesives can form elastic or plastic bonds, according to the particular adhesives. Phenol-formaldehyde and melamine-formaldehyde form plastic bonds. Preferably, connector bases 30c–40c include bumps, textures, ridges, perforation, segments, or other surface discontinuities (not shown in FIGS. 2a–2f) that enhance the adhesion of the glues or adhesives.

Structural wood couplings 30a–40a include connector extensions 30d–40d with couplings 30e–40e for connecting to the other structural member 29. The shape, form, length, and geometry of the structural wood couplings 30a–40a may be selected according to the structural application and the loads and moments to be borne by the connection, as described below in greater detail. As shown, connector bases 30c–40c and connector extensions 30d–40d have various shapes, forms and geometries, including straight, curved, bent, planar, tubular, circular, and compound shapes.

Structural wood couplings 30a–40a also show that connector bases 30c–40c and respective connector extensions 30d–40d may be joined together in a variety of ways. For example, bases 30c, 34c, and 36c may be joined with respective extensions 30d, 34d, and 36d by welding, gluing, or other bonding methods, or may be formed together integrally. Extension 32d includes external threads that complement internal threads in base 32c so they can be screwed together. Base 38c and extension 38d may be joined by, for example, welding or an adhesive, and base 40c and extension 40d may be bolted or pinned together.

Connector extensions 30d–40d include couplings 30e–40e for connecting to the other structural member 29 that are merely examples of the many types of such couplings usable in accordance with the present invention. Connector extension 30d includes a coupling 30e adapted to be bolted as a plate to a steel column. Connector extension 32d includes a coupling 32e for gluing or adhering in a pocket formed in concrete or wood. Connector extension 34d includes a coupling 34e for setting into and being held by concrete. Connector extension 36d includes a coupling 36e for adhering to another wood member or concrete. Connector extension 38d includes external threads for connecting to a coupling 38e with internal threads that can also receive a plastic bolt. Connector extension 40d includes a coupling 40e for welding to a steel column.

FIGS. 3a–3e are isometric end views of a structural wood member 48 with various alternative connector pockets 50a–58a and corresponding connector bases 50b–58b, respectively. It will be appreciated that the embodiments shown in FIGS. 3a–3e are shown together for purposes of brevity and would typically not all be used together as shown. The embodiments of FIGS. 3a–3e are intended to show in part the variety of structural couplings that can be formed in accordance with the present invention.

Connector pockets 50a–58a have a variety of configurations, including a simple bore 50a, a pair of bores and a connecting slot 52a, a simple curved slot 54a, a flat slot 56a, and a compound curved slot 58a. Connector pockets 50a–58a can be manufactured in multiple ways, including drilling, cutting, sawing, grinding, or machining.

Connector bases 50b–58b show exemplary details that include bumps, textures, ridges, perforations, segments, or other surface discontinuities that enhance the adhesion of the glues or adhesives, as well as slits, slots, or holes that enhance the distribution of liquid adhesive over the complementary surfaces of pockets 50a–58a and bases 50b–58b.

Connector base 50b includes multiple longitudinal external channels 50c that facilitate distribution of adhesive and provide surface discontinuities that improve adhesion. Connector base 52b includes a longitudinal bore 52c for passing adhesive into pocket 52a and annular threads or ridges 52d for improving adhesion. Connector base 54b includes perforations 54c that facilitate distribution of adhesive and provide surface discontinuities that improve adhesion. Perforations 54c are shown as being circular, but could similarly be square, oval, rectangular, etc. Connector base 56b includes a roughened or textured surface 56c that can be formed mechanically or chemically. Connector base 58b shows in combination slits 58c, ridges 58d, and texturing 58e.

An advantage of curved connector bases and bumps or ridges thereon is that the curves and surface textures help provide uniform positioning of the connector bases within the connector pockets. This provides uniformly even gluelines between the connector bases and pockets, thereby enhancing the adhesion between them.

Each of connector bases 50b–58b is suited to particular loads and moments for supporting wood structural member 48. FIGS. 3a–3e show the directions of the forces or moments for which the each of connector bases 50b–58b is particularly suited, where tensile/compressive forces are designated N, shear forces are designated Q, and moments are designated M.

FIGS. 4a and 4b are exploded isometric end views of a pair of structural wood members 80a and 82a with connectors 80b and 82b having connector pockets 80c and 82c for connector bases 80d and 82d, respectively. Connector pocket 80c may be cut with a circular ring drill. Connector base 80d includes elongated steel tubular (e.g., cylindrical) segments 80e secured to a flat circular disk 80f. A connector extension 80g has three rods with external threads 80h for coupling to another structural member (not shown). In accordance with this invention, connector base 80d is held within pocket 80c with an adhesive. Separations between segments 80e facilitate distribution of the adhesive and adhesion between base 80d and pocket 80c.

Structural wood member 82a is an angled wood structural beam (e.g., glue laminated) with a layer of synthetic reinforcement 84 of the type described, for example, in U.S. Pat. No. 5,362,545. Connector pocket 82c includes two discrete sections formed with a computer-controlled machine driven drill. Connector base 82d is a segmented tube (e.g., cylinder) of reinforced plastic composite with perforations 82e or, alternatively, a surface slightly roughened by an acid treatment, in a manner known to persons skilled in the art, to improve adhesion. An internally threaded cylindrical extension 82f provides coupling to another structural member (not shown). Perforations 82e in connector base 82d further improve adhesion and facilitate distribution of the adhesive. Preferably, structural wood member 82a would include a second such connector (not shown) with a connector pocket 82b' due to the angled configuration a member 82a. Such non-metal components are particularly desireable in applications requiring minimal weight in structural members.

Each of connectors 80b and 82b is suited to particular loads and moments for supporting respective wood structural members 80a and 82a. FIGS. 4a and 4b show the directions of the forces or moments for which each of connectors 80b and 82b is particularly suited, where tensile/compressive forces are designated N, shear forces are designated Q, and moments are designated M. Moreover, multiple connectors 82b and 80b are of relatively large diameter (e.g., at least 10 cm) and would be suited for bearing even relatively large moments. For example, a pair of such connectors with diameters of 10 cm each and a minimal separation between them could bear a moment of at least 16 kN-M (kiloNewton-meters). Separation between the connectors increases the moment capacity quadratically. By comparison, the moment capacity for a single such connector could be 4 kN-M.

FIGS. 5a and 5b are exploded isometric end views of a pair of structural wood members 86a and 88a with connectors 86b and 88b having connector pockets 86c and 88c for connector bases 86d and 88d, respectively. Structural wood member 86a is, for example, a kiln dried lumber with a steel grid reinforcement 86e. Connector pocket 86c is cut into structural wood member 86a and through reinforcement 86e with a laser. As known in the art, such laser cutting does not burn or otherwise damage the surface of the wood member 86a or reinforcement 86e.

Connector base 86d is preferably a steel casting and includes an elongated tube (e.g., generally cylindrical) with an integral flat side that functions as an external connector extension 86f that extends along and from structural wood members 86a. As a result, connector base 86d is a combination of an internal and an external structural wood connector. Connector base 86d encloses a portion of reinforcement 86e and allows connector extension 86f to be coupled against the side surface for connection with material of any kind on the surface of structural wood member 86a. In accordance with this invention, connector base 86d is held within pocket 86c with an adhesive and includes slits 86g that facilitate distribution of the adhesive and adhesion between base 86d and pocket 86c.

Structural wood member 88a is, for example, an oriented strand lumber board. Connector pocket 88c includes three planar slots that are cut into structural wood member 88a with a conventional circular saw. Connector base 88d is preferably a welded stainless steel assembly to minimize susceptibility to oxidation (e.g., for wet conditions) and includes three spaced pairs of flat adjacent tongues 88e that extend from u-shaped connector extension 88f.

Tongues 88e allow structural wood member 88a to undergo dimensional variation with atmospheric conditions while substantially eliminating cross tensional forces. In accordance with this invention, connector base 88d is held within pocket 88c with an adhesive and the separations between the tongues in a pair functions as slits that facilitate distribution of the adhesive and adhesion between base 88d and pocket 88c. Rims 88g along the outer edges of tongues 88e substantially close connector pockets 88c and prevent leakage of glue from pockets 88c during gluing. Tongues 88e are roughened, for example, by stamped nubs, bumps, or welding spots, to improve the friction and to verify a constant positioning in the connector pockets.

FIGS. 5a and 5b show the directions of the forces or moments for which each of connector bases 86d and 88d is particularly suited, when tensile/compressive forces are designated N, shear forces are designated Q and moments are designated M. Moreover, tensile/compressive forces N on connector 86b together with tensile/compressive forces N, against wood structural member 86a would result in a relatively large moment that connector 86b is capable of bearing. Connector 88b is also suited for relatively large moments.

Figure 6A:
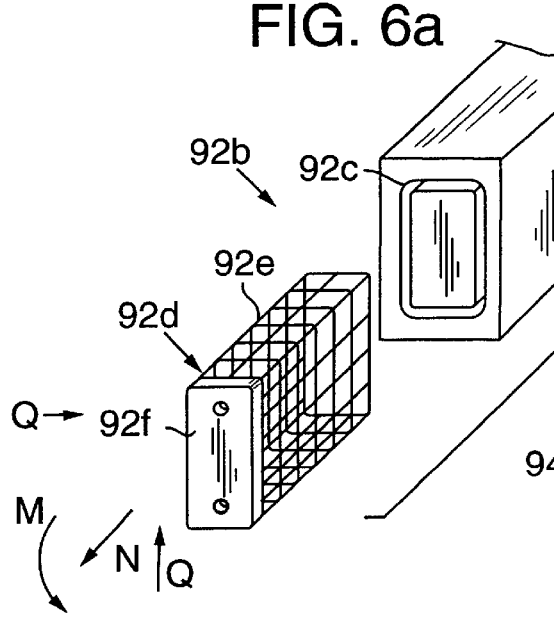
FIGS. 6a and 6b are exploded isometric views of alternative embodiments of the connection system with metal grid connectors.
Figure 6B:
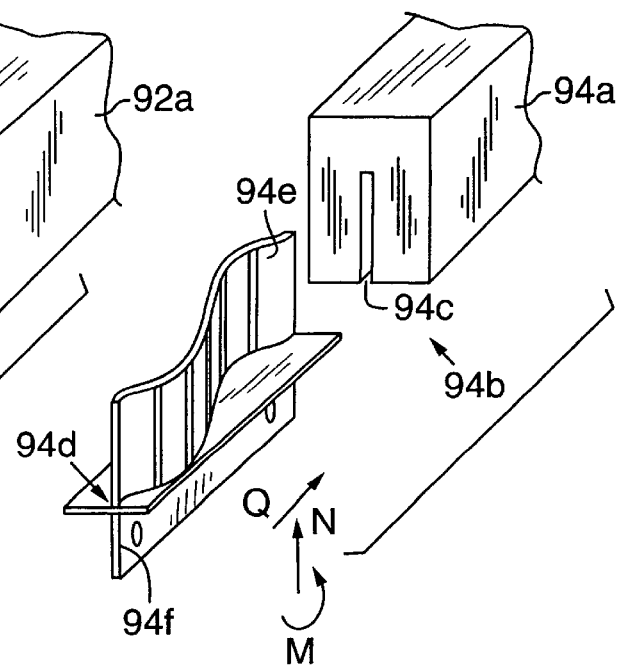

FIGS. 6a and 6b are exploded isometric end views of a pair of structural wood members 92a and 94a with connectors 92b and 94b having connector pockets 92c and 94c for connector bases 92d and 94d, respectively. Structural wood members 92a and 94a are preferably engineered wood products, for example, parallel stranded lumber or longitudinally stranded lumber such as that produced by Trus Joist McMillan of Boise, Id. Such engineered wood is typically stronger than solids on lumber, but these strength advantages cannot be fully exploited with conventional external steel plate and bolt connectors.

Connector pockets 92c and 94c are cut into respective structural wood members 92a and 94a with, for example, an electric sword saw. Connector 92b includes a tube-shaped grid section 92e formed of, for example, a high-strength plastic-coated fiber composites such as polypropylene with 40% mineral fibers, and a metal (e.g., steel) base plate 92f secured to grid section 92e by welding or an adhesive. Similarly, connector 94b includes a metal (e.g., steel) grid 94e formed in a compound curve and welded to a T-shaped base section 94f. Connector base 94d fits within a complementary-shaped pocket 94c.

As described with reference to other preferred embodiments, connector bases 92d and 94d are adhered within respective connector pockets 92c and 94c. A benefit of the configurations of connectors 92b and 94b is that they minimize removal of wood material from respective structural wood members 92a and 94b and therefore provide maximal load or moment-carrying capacity. The directions of the forces or moments for which each of connectors 92b and 94b is particularly suited are shown, where tensile/compressive forces are designated N, shear forces are designated Q, and moments are designated M.

Figure 7A:
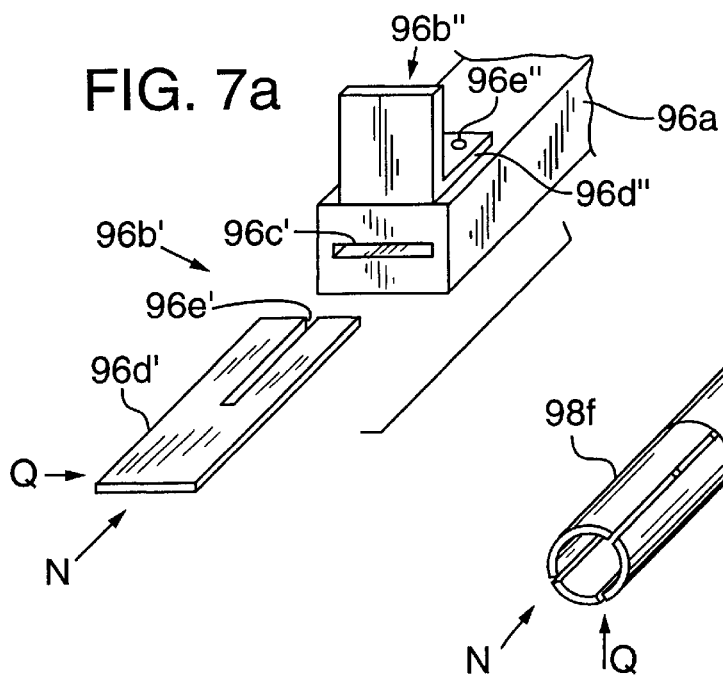
FIGS. 7a and 7b are exploded isometric views of still further embodiments of the connection system.
Figure 7B:
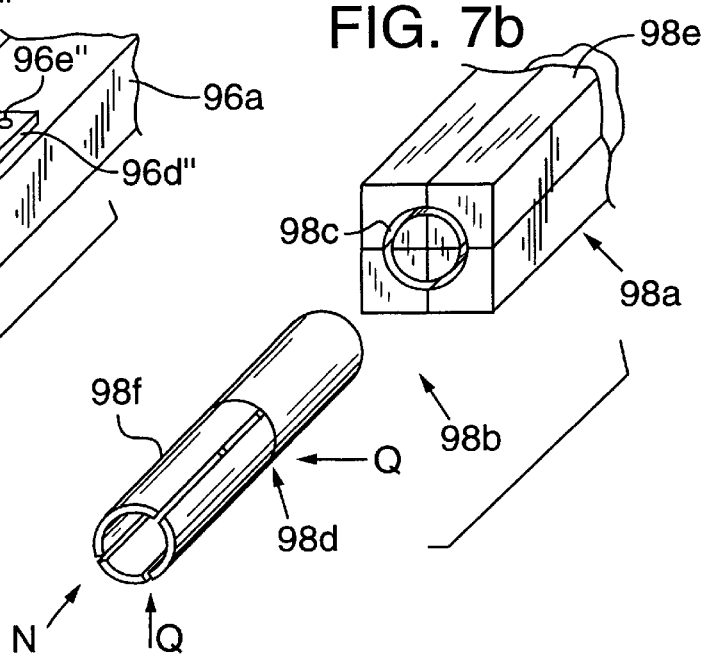

FIGS. 7a and 7b are exploded isometric end views of a structural wood member 96a with connector 96b' and 96b'' and a structural wood member 98a with a connector 98b. Connectors 96b' and 98b have connector pockets 96c' and 98c for connector bases 96d' and 98d, respectively. Structural wood member 96a is, for example, a laminated veneer lumber and shows cooperation between a pair of connectors 96b' and 96b'', as well as an example of an external connector 96b'' according to the present invention. Connector base 96d' is generally flat and planar, formed of a fiber-reinforced ceramic, and includes a slit 96e' that functions similar to those shown above in FIGS. 4 and 5. Connector base 96d' is adhered within connector pocket 96c' adjacent a side of structural wood member 96a against which connector base 96d'' is secured. More specifically, connector base 96d'' is angled and formed of a metal such as, for example, hardened steel, and is adhered against the side of structural wood member 96a. During assembly, nails, screws, or dowels 96e'' are driven through connector base 96d'' to secure it in place while the adhesive cures. The nails, screws, or dowels may optionally pass through connector base 96d' to further secure it in place. External connector 96b'' is particularly advantageous in structural wood member 96a of relatively small cross sectional area.

Connector 98b includes a connector base 98d that is adhered within a connector pocket 98c and also secures together multiple (e.g., four) separate boards 98e that comprise structural wood member 98a. The separate boards of structural wood member 98a may be, for example, solid sawn lumber, and connector pocket 98c is drilled within the boards while they are clamped together. Connector base 98d and connector extension 98f may be of, for example, cast iron, in which connector base 98d is a solid base and connector extension 98f is a slotted tube (i.e., cylinder). In this embodiment, solid tubular connector base 98d does not include the structural discontinuities included in other embodiments, so as to provide enhanced structural integrity for holding together separate boards 98e of structural wood member 98a. In contrast, slotted tubular connector extension 98f may be adhered to another integral wood structural member as described hereinabove.

FIGS. 7a and 7b show the directions of the forces or moments for each of connectors 96b' and 98b is particularly suited, where tensile/compressive forces are designed N and shear forces are designated Q. Although not shown, it will be appreciated that the combination of connector 96b' and 96'', as well as connector 98b are well suited to moments in a variety of directions.

FIG. 8 is an exploded isometric end view of a structural wood member 102a with a connector 102b having a connector pocket 102c for a connector base 102d. Connector base 102d includes multiple (e.g., six) rods 102e secured to a rectangular band 102f. Pocket 102c receive rods 102e and band 102f. Connector 102b is an example of multiple distinct components employed in connector base 102d that partly extends from structural wood member 102a. The directions of the forces are moments for which connector 102b is particularly suited are shown, where tensile/ compressive forces are designated N, shear forces are designated Q, and moments are designated M.

FIG. 9 is an exploded isometric end view of structural wood member 104a with a connector 104b having a connector pocket 104c for a connector base 104d. Connector base 104d includes multiple generally flat tongues 104e that extend from a generally flat segment 104f. Connector pocket 104c includes a recess for receiving flat segment 104f, thereby to provide a connector 104b of the present invention that is generally flush with the surface of structural wood member 104a. The directions of the forces or moments for which connector 104b is particularly suited are shown, where tensile/compressive forces are designated N, shear forces are designated Q, and moments are designated M.

FIG. 10 is an exploded isometric view of a structural wood truss 106a with external connectors 106b' and 106b" for securing together individual truss components 106d, 106e, and 106f. Connector 106b' is a steel plate with sharp protrusions or teeth 106g' stamped partly from the plate, as is common in conventional wood assembly materials. External connector 106b' could be secured to truss 106a by the combination of pounding protrusions or teeth 106g' into truss 106a and adhering the steel plate thereto. External connector 106B" is also a steel plate and includes circular perforations 106g' and slits 106h". External connector 106b" may be adhered to truss 106a with slits 106h" improving adhesion and perforations 106g" allowing supplemental securing of the steel plate with nails, screws, or bolts (not shown).

Figure 11A:
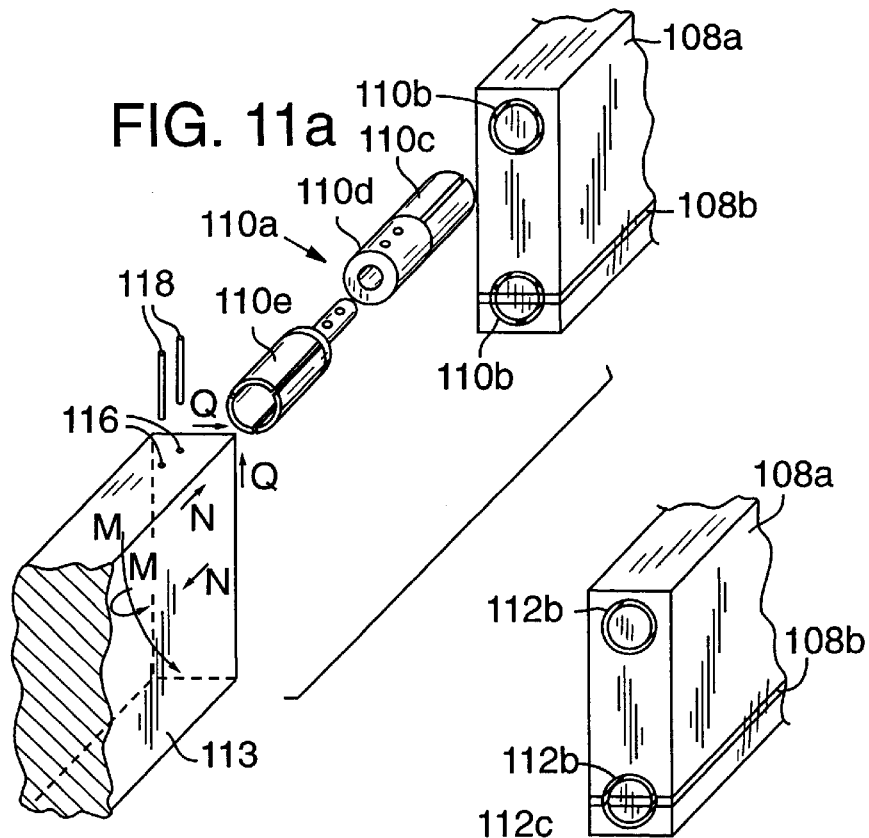
FIGS. 11a and 11b are exploded isometric views of the connection system with various tubular connectors.
Figure 11B:
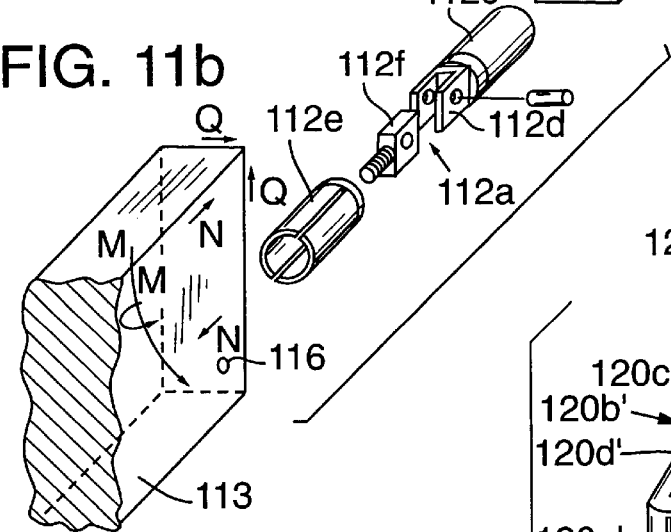

FIGS. 11a and 11b are exploded isometric views of a structural wood member 108a with a reinforcement layer 108b with connectors 110a and 112a having connector pockets 110b and 112b for connector bases 110c and 112c and connector extensions 110d and 112d, respectively. Connector extensions 110d and 112d include couplings 110e and 112e for connection to another structural member 113.

Connector pockets 110b and 112b and corresponding connector bases 110c and 112c are configured and function similar to respective connector pockets 80c and 82c and connector bases 82d and 80d shown in FIGS. 4a and 4b. Connector extension 110d includes a collar for receiving and securing an extension rod. Connector extension 112d includes a bracket for receiving a brace 112f. Connector extensions 110d and 112d are configured as segmented tubular (e.g., cylindrical) connector bases for insertion into complementary pockets (not shown) within a structural member 113.

In accordance with this preferred embodiment, structural member 113 includes adhesive feeder channels 116 that extend to the connector pockets therein. Adhesive feeder channels 116 may include tubes 118 and facilitate application of adhesive within the connector pockets in structural member 113 and therefore facilitate assembly of structural members 108a and 113. It will be appreciated that adhesive feeder channels 116 could be employed in assembling wood structural members and connectors of the present invention.

Other features of connectors 110a and 112a are that brace 112f of connector extension of 112d includes threads complementary to internal threads on coupling 112e to allow adjustment therebetween during assembly of structural members 108a and 113. Another feature is that connector pocket 112b and connector base 112c encircle reinforcement layer 108b in wood structural member 108a. Reinforcement layer 108a tends to bear more of the load on wood structural member 108a than the adjacent wood portions. Positioning connector pocket 112b to encompass reinforcement layer 108b allows connector 112a to more efficiently transmit the load on wood structural member 108a. The directions of the forces are moments for which connectors 110a and 112a are suited are shown, where tensile/compressive forces are designated N, shear forces are designated Q, and moments are designated M.

Figure 12:
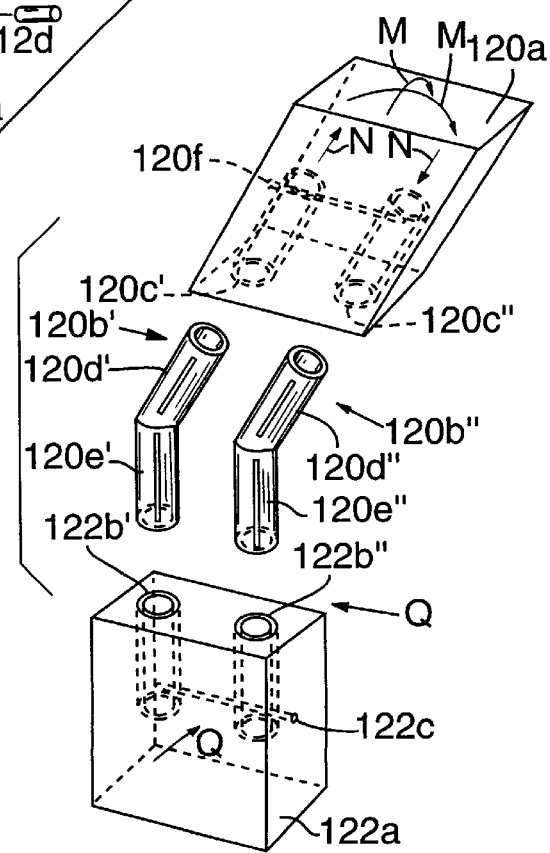
FIG. 12 is an exploded isometric view of an embodiment of the connection system with a tubular connector.

FIG. 12 is an exploded isometric view of a wood structural member 120a with a pair of connectors 120b' and 120b" having connector pocket 120c' and 120c" for connector bases 120d' and 120d", respectively. Connectors 120b' and 120b" include connector extensions 120e' and 120e" that are substantially similar to connector bases 120d' and 120d" but are angled relative thereto. A second wood structural member 122a has a pair of connector pockets 122b' and 122b" for receiving connector extensions 120e' and 120e", respectively.

Wood structural members 120a and 122a include respective adhesive feeder channels 120f and 122c through which adhesive can be applied to connector pockets 120c', 120c" and 122b' and 122b", respectively. As described above, connector bases 120d' and 120d" and connector extensions 120e' and 120e" are segmented or slotted. Connector 120b' and 120b" allow wood structural members 120a and 122a to be flush-mounted together with the connectors completely enclosed therein. Moreover, the angle between connector bases 120d' and 120d" and respective extensions 120e' and 120e" are particularly suited in, for example, portal frames, roof structures, and the like. The directions of the forces or moments for which connectors 120b' and 120b" are suited are shown, where tensile/compressive forces are designated N, shear forces are designated Q, and moments are designated M.

Adhesive feeder channels 120f and 122c can facilitate automatic or measured application of adhesives with pneumatic controls or pressure injection. This can also provide verification of equal and complete application of adhesives. Moreover, adhesive control channels, distinct from but similar to feeder channels 120f and 122c, can function as indicators that adhesive application is complete when adhesive is forced out of the channels. Pressure gauges could be coupled to the adhesive control channels to provide measured control of adhesives.

It will be clear to those having skill in the art that many changes may be made to the details of the present invention without departing from the principles thereof. The scope of the present invention should be determined, therefore, only by the following claims.

I claim:

1. A connection system, comprising:

a wood structural member having an interior and including at least one slot extending into the wood structural member and characterized by a cross-sectional configuration defined by opposed first and second inner surfaces;

a connector for insertion into the wood structural member, the connector including a connection end for connection to another structural member and the connector including for each slot of the wood structural member a tongue having a cross-sectional configuration that is matably complementary to the cross-sectional configuration of the slot to which the tongue corresponds in the wood structural member, each tongue having opposed first and second inner connecting surfaces and being dimensioned to substantially fill the slot to which the tongue corresponds in the wood structural member so that the first inner surface of the slot opposes the first inner connecting surface of the tongue and the second inner surface of the slot opposes the second inner connecting surface of the tongue leaving a small gap therebetween, and at least one tongue of the connector having at least one discontinuity that creates an opening between the first and second inner connecting surfaces and thereby forms a local widening portion in the gap between the first and second inner connecting surfaces of the tongue and the first and second inner surfaces of the slot;

an adhesive located within the gap and covering the first and second inner connecting surfaces of the tongue and the first and second inner surfaces of the slot, the adhesive filling the opening between the first and second inner connecting surfaces and forming a connection interface to secure the tongue of the connector within the slot and thereby directly transmit internal or external load forces from the wood structural member to the connector, and the discontinuity cooperating with the adhesive to allow expansion and contraction of the wood structural member so that the connection interface between the connector and the wood structural member remains intact through dimensional variations of the wood structural member; and a gap closure member mounted to a side margin defined by a boundary of the first and second inner connecting surfaces of each tongue and of sufficient size to close the gap and thereby prevent leakage of the adhesive during its placement in the gap.

2. The connection system of claim 1 in which there are multiple tongues that are bisected in a common direction to form multiple discontinuities.

3. The connection system of claim 2 in which each of the multiple tongues has first and second side margins, the first side margin of each tongue supporting a first rim and the second side margin of each tongue supporting a second rim, and the first and second rims forming gap closure members positioned outside the interior of the wood structural member.

4. The connection system of claim 2 in which the tongues are flat.

5. The connection system of claim 1 wherein the adhesive comprises phenol-formaldehyde, melamine-formaldehyde, polyester, epoxy, or polyurethane.

6. The connection system of claim 1 in which the side margin of each tongue having at least one discontinuity supports a rim positioned outside the interior of the wood structural member to close the gap.

7. The connection system of claim 6 in which the rim forms a connector base of a T-shaped base section.

8. The connection system of claim 6 in which the rim forms a base of the connection end of the connector, the connector being adapted for connection to another structural member made of concrete.

9. The connection system of claim 6 in which each tongue having at least one discontinuity includes multiple discontinuities formed by a grid structure.

10. The connection system of claim 9 in which the grid structure is in the shape of a curve.

11. The connection system of claim 1 in which each tongue having at least one discontinuity includes multiple discontinuities formed by a grid structure.

12. The connection system of claim 11 in which the grid structure is in the shape of a curve.

13. The connection system of claim 1 in which the connector is adapted for connection to another structural member made of concrete.

* * * * *